United States Patent [19]

Gastinger et al.

[11] Patent Number: 4,891,395

[45] Date of Patent: Jan. 2, 1990

[54] HIGH STYRENE CONTENT, STABLE POLYMER USING EPOXY RESIN-MODIFIED POLYOLS AS DISPERSANTS

[75] Inventors: Robert G. Gastinger, West Chester, Pa.; John E. Hayes, Wilmington, Del.

[73] Assignee: ARCO Chemical Technology, Inc., Wilmington, Del.

[21] Appl. No.: 198,035

[22] Filed: May 24, 1988

[51] Int. Cl.$^4$ .......................... C08K 5/04; C08L 75/04
[52] U.S. Cl. ..................................... 523/456; 525/549; 525/131
[58] Field of Search ................. 524/757; 525/404, 549, 525/131; 528/75, 73, 83; 523/456

[56] References Cited

U.S. PATENT DOCUMENTS

| | | | |
|---|---|---|---|
| 4,116,893 | 9/1978 | Flanagan | 521/159 |
| 4,316,991 | 2/1982 | Speranza et al. | 568/609 |
| 4,495,341 | 1/1985 | Stamberger | 528/110 |
| 4,524,157 | 6/1985 | Stamberger | 521/157 |
| 4,539,339 | 9/1985 | Cuscurida et al. | 521/137 |
| 4,539,378 | 9/1985 | Cuscurida et al. | 525/407 |
| 4,554,295 | 11/1985 | Ridge, Jr. | 521/111 |
| 4,593,051 | 6/1986 | Koleske | 525/118 |
| 4,594,366 | 6/1986 | Taylor et al. | 521/137 |
| 4,647,624 | 3/1987 | Stamberger | 525/187 |
| 4,683,272 | 7/1987 | Cuscarida et al. | 521/137 |

*Primary Examiner*—Allan M. Lieberman
*Attorney, Agent, or Firm*—Steve Rosenblatt; David L. Mossman

[57] ABSTRACT

Very low viscosity polymer polyols having high styrene/acrylonitrile ratios and good stability may be achieved by the use of epoxy resin-modified polyols as dispersants. The epoxy resin-modified polyols useful as dispersants may be made by reacting a polyol initiator having an active hydrogen functionality of 3 to 8 and one or more alkylene oxides with an epoxy resin. It is preferred that all of the epoxy resin-modified base polyol dispersant be initially charged to the reactor, along with part of the base polyol. In this invention, the base polyol is a conventional polyol unmodified with epoxy resin. The use of epoxy resin-modified polyols as dispersants results in polymer polyols having higher styrene contents, and improved stability and viscosity properties.

22 Claims, No Drawings

HIGH STYRENE CONTENT, STABLE POLYMER USING EPOXY RESIN-MODIFIED POLYOLS AS DISPERSANTS

CROSS-REFERENCE TO RELATED APPLICATION

This application is related to U.S. patent application Ser. No. 197,868, filed 05/24/88, now U.S. Pat. No. 4,855,330, relating to epoxy resin-modified polyols as base polyols for polymer polyols.

FIELD OF THE INVENTION

The invention relates to the synthesis of polymer polyols, and, in one aspect, more particularly relates to styrene/acrylonitrile (SAN) copolymer polyols with low viscosities employing epoxy resin-modified polyols as dispersants.

BACKGROUND OF THE INVENTION

The use of a polyol in the preparation of polyurethanes by reaction of the polyol with a polyisocyanate in the presence of a catalyst and perhaps other ingredients is well known. Conventional polyols for flexible polyurethane foams, such as slab urethane foams, are usually made by the reaction of a polyhydric alcohol with an alkylene oxide, usually ethylene oxide and/or propylene oxide, to a molecular weight of about 2,000 to 5,000 and above. These polyols are then reacted with polyisocyanate in the presence of water or other blowing agents such as fluorocarbons to obtain polyurethane foams. Polyols have been modified in many ways in attempts to improve the properties of the resulting polyurethane, for example, by using a polymer polyol as the polyol component. Conventional polyols may be used as the dispersing media or base polyol in these polymer polyols.

For example, dispersions of polymers of vinyl compounds such as styrene, acrylonitrile or a mixture of the two (abbreviated as SAN monomers), or of polyurea polymers, such as those prepared from toluene diisocyanate (TDI) and hydrazine in conventional polyols have been included to improve the properties of the polyols, and thus, the properties of the resulting foam. Polyurethane foams with higher load bearing properties (ILD-indentation load deflection, and CFD-compression force deflection) may be produced in this manner. It would be desirable if polymer polyols could be prepared which would be stable and have low viscosities. Stability is important to the storage life of the polyols before they are used to make the polyurethane foams. Low viscosities and small particle sizes are important in a good quality polyol to permit it to be pumped easily in high volume foam producing equipment.

It would further be desirable if styrene/acrylonitrile polymer polyols could be synthesized which would have large SAN ratios. The substitution of styrene for acrylonitrile in these polymer polyols helps prevent discoloration during the cure of the polyurethane, and also helps improve flame retardability of the resultant foams. However, the stability of the polymer polyols decreases with increasing styrene to acrylonitrile ratios. That is, the components tend to separate upon standing during storage. Viscosity and particle size are also typically adversely affected with high styrene contents.

U.S. Pat. Nos. 4,539,378 and 4,539,339 describe polymer polyols made using epoxy resin-modified polyols and polyurethane foams prepared therefrom. The improvement claimed in these patents is that polymer polyols made in these epoxy resin-modified polyols as base polyols give flexible polyurethane foams with greater load bearing properties than if made with other polyols. The use of the base epoxy resin-modified polyol in polyurethane foams to give foams with enhanced properties was known at this time by virtue of U.S. Pat. No. 4,316,991. Although it is claimed therein that the monomer component is a mixture of styrene and acrylonitrile in a mole ratio of 9:1 to 1:9, equivalent to a weight ratio of about 18:1 to 1:18, all examples given therein are at styrene/acrylonitrile ratios of 40/60. Methods for achieving styrene/acrylonitrile ratios greater than 40/60 in polymer polyols, or synthesizing polymer polyols with low viscosities are not taught in this patent. In prefacing the examples therein with a general conditions statement, it is asserted that to obtain the vinyl polymer polyols of the invention that all of the epoxy resin modified polyol is preferably added first to the reaction vessel. This teaching is consistent with the examples therein.

It is well known in the art that high styrene content polymer polyols are desirable, but difficult to prepare for the reasons stated above. Regardless of the teachings of the patents discussed above, it would be unexpected to find that epoxy resin-modified polyols may be useful in preparing polymer polyols that did not only have high styrene contents, but which also had good stability, small particle sizes, and low viscosity.

SUMMARY OF THE INVENTION

Accordingly, it is an object of the present invention to provide stable, low viscosity polymer polyols of high styrene to acrylonitrile (SAN) ratios, and a method for making such polymer polyols. In one aspect of the invention, these SAN ratios may range from about 60/40 to even 85/15.

It is another object of the present invention to provide a particular process for the production of the stable, low viscosity SAN polymer polyols of the present invention using epoxy resin-modified polyols as a dispersant.

It is yet another object of the invention to provide stable, low viscosity polymer polyols of high SAN ratios employing epoxy resin-modified polyols as a dispersant. In one aspect of the invention, the epoxy resin-modified polyol is added to the reactor charge with the base polyol which is not modified with epoxy resin. Additional base polyol is then added in the feed stream along with the monomer component and its initiator.

In carrying out these and other objects of the invention, there is provided, in one form, stable, low viscosity polymer polyols made by a process of polymerizing, via a free-radical reaction, a monomer component in the presence of a polyol mixture comprising a major portion of a base polyol unmodified with an epoxy resin and a minor portion of an epoxy resin-modified polyol as a dispersant.

DETAILED DESCRIPTION OF THE INVENTION

It has been surprisingly discovered that a process using a epoxy resin-modified polyols as a dispersant in conjunction with base polyol that is not modified with an epoxy resin can produce improved polymer polyols with low viscosity, good stability and high SAN weight ratios. A smaller average particle size of the dispersed solid is also obtained. The method produces stable, low viscosity polymer polyols at SAN ratios of from about 60/40 to 85/15. The reactor may be a batch reactor, a semi-batch reactor or one or more continuous stirred tank reactors (CSTRs).

In one aspect of the invention, if a batch reactor is used, the base polyol is added in two portions. The first portion is added with the charge to the reactor, and the second portion is added in the feed stream to the reactor. In a preferred embodiment, the first portion is less than the second portion. When two portions of base polyol are used, the ratio of the first portion of base polyol to second portion thereof may range from 1/99 to 50/50, preferably from 5/95 to 30/70, based on weight. In another aspect of the invention, if a CSTR is employed, the base polyol need not be added in two portions, but may be added in one portion. In yet another aspect of the invention, two or more CSTRs in series may be employed to advantage, for example, if a particular sequence of component additions is advantageous.

Without dispersants or other special techniques, typical conventional SAN ratios could only reach as high as the range of about 60/40–65/35. In contrast, the SAN ratios that can be supported by the polymer polyols of the present invention using epoxy resin-modified polyol dispersants range from greater than 60/40 to about 85/15, more commonly being in the range of about 65/35 to about 80/20. The viscosities available with the method of this invention are less than those made using only epoxy resin-modified polyols as the base polyol with no dispersant.

The base polyol is the major portion of the polyol material used, whereas the epoxy resin-modified polyol dispersant is a minor portion of the total polyol material used. The ratio of total base polyol (including all portions, if multiple proportions are used) to epoxy resin-modified polyol dispersant ranges from about 50/50 to about 99/1, and preferably from about 70/30 to about 99/1.

Generally, the dispersants may be any polyols known to have been modified with epoxy resins, although polyether polyols modified with epoxy resins are a preferred group. For example, U.S. Pat. No. 4,495,341 to Stamberger describes adducts produced by reacting suitable polyol and epoxy co-reactant to essentially eliminate all epoxy groups. In one embodiment therein, the amount of epoxy co-reactant is greater than 2% but less than 10% by weight based on the amount of polyol. In a preferred embodiment of the present invention, however, the dispersant polyol is made by the method described in U.S. Pat. No. 4,316,991 to Speranza, incorporated by reference herein. Briefly, these epoxy resin-modified polyols may be made by reacting a polyol initiator with one or more alkylene oxides to extend the polyol chain, and adding epoxy resin. Although U.S. Pat. No. 4,316,991 indicates that the epoxy resin is added at selected points internally along the length of the polyol chain, it is anticipated herein that epoxy resin-modified polyols made using the epoxy resin as a cap, or both as a cap and internally, would give modified polyols suitable in synthesizing the polymer polyols of the present invention.

In one aspect of the invention, it is recommended that in the preparation of the epoxy resin-modified polyol dispersants that at least two equivalents of hydroxyl functionality be present per equivalent of epoxy resin added to the reaction mixture to avoid gelling of the epoxy by crosslinking with itself. The epoxy resin may be added before, during and/or after the addition of alkylene oxide to the polyol initiator. In one aspect of the invention, good results are obtained if the resin is not added only as a "cap", that is, after all of the oxide has been added which results in the resin being attached to the end of the resulting polyol chain only. The wt.% of epoxy resin added based on the final polyol dispersant may range from about 0.25 to about 5.0 wt.% or higher in a broadest range, and from about 0.25 to 2.0 wt.% in a somewhat narrower range. The preferred range of epoxy resin proportion is from about 0.5 to about 1.5 wt.%. One skilled in the art may determine the best procedure with respect to when additions should be made and at what temperature and during which times the reaction mixture is to be heated.

The preferred dispersants of this invention, those containing less than 2 wt.% epoxy resin, have been found suitable to produce polymer polyols at solid levels of up to 40%. Typically, these solid levels range from about 15–30%.

The base polyol preferably has a molecular weight of from about 2000 to 6500, and is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP) α-methylglucoside, β-methylglucoside or other methylglucoside, resins of phenol, aniline and mixed phenol aniline, such as methylenedianiline or bisphenol A, Mannich condensates and mixtures thereof, for example. The base polyol may be made by alkoxylating the initiator with a desired number of moles of an alkylene oxide. Preferably, the alkylene oxide has two to four carbon atoms, and is thus, ethylene oxide, propylene oxide, butylene oxide or mixtures of these oxides. The oxides may be mixed upon addition, or may be added to the polyol initiator chain separately to form blocks or caps. In a preferred aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein.

It is anticipated that a wide variety of epoxy resins would be useful in making the epoxy resin-modified dispersant polyols useful herein. The vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted, if desired, with other substituents besides the epoxy groups, e.g. hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e. isopropylidene bisphenol, novolak, resorcinol, etc. The epoxy derivatives of methylene or isopropylidene bisphenols are especially preferred. The diglycidyl ether of bisphenol A is particularly useful.

Some of these epoxy resins are known in the trade as "Epon" resins and may be obtained from Shell Chemical Co.

A widely used class of polyepoxides which are useful includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and other polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols, such as monochlorohydrins of glycerol, sorbitol, pentaerythritol and the like.

Another class of polymeric polyepoxides which can be amine cured and are useful includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in H. Lee, et al. Handbook of Epoxy Resins, McGraw Hill Book Co., New York, 1967.

It will be appreciated by those skilled in the art that the polyepoxide compositions which are useful according to the procedure of making the epoxy resin-modified polyols useful in the present invention are not limited to those containing the above described polyepoxides, but that these polyepoxides are to be considered merely as being representative of the class of polyepoxides as a whole.

The reaction conditions of temperature and pressure may be selected by the invention practitioner to meet certain specifications required by the polyol for making SAN polymer polyols. A pressure of about 50 psig and a temperature of from about 50° to 150° C. are representative conditions for the making of the epoxy resin-modified polyols. The amount of epoxy resin to be added to the reaction mixture should be such that the epoxy equivalents present are less than half of the hydroxyl functionality equivalents present in the reaction mixture. Too many epoxy equivalents in relation to the hydroxyl equivalents may cause the epoxy resin to gel by cross-linking with itself. As a result, a large excess of hydroxyl equivalents may be used in the reaction mixture. The modified polyol resulting from this method would preferably have a molecular weight in the range of 2,000 to 7,000. It is conceivable that higher molecular weight modified polyols could be prepared by the methods of this invention.

The preparation of the polymer polyols of the present invention may be performed at a temperature in the range of 80° to 150° C., preferably in the range of about 100° to 130° C.

Any suitable addition time of the feed stream to the reactor contents may be employed, for example, the addition time may range from 0.5 to 4.0 hours, preferably 1 to 2.5 hours. The proportion of the polymerization initiator as a wt.% of the total reactants may range from 0.05 to 5.0 wt.%, preferably 0.1 to 1.0 wt.%.

The preferred monomers employed in the method and polymer polyols of the present invention are both styrene and acrylonitrile to make a copolymer. The relative proportions of styrene to acrylonitrile, the SAN ratio, has been discussed above and will exemplified below. Other suitable monomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, nitrostryrene, N,N-dimethylaminostyrene, acetoxystyrene, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides, such as N-phenylmaleimide and the like.

The polymerization initiator catalyst may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds, and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate, 2,2'-azo-bis(2-methylbutanenitrile) for example. Other suitable catalysts may be employed, of course.

Procedures for Measurements of Physical Properties of Polymer Polyols

Viscosities were measured using a Brookfield cone and plate viscometer, Spindle #CP-52, operated at 20 secs.$^{-1}$ at 25° C.
Particle sizes were measured using a Coulter N4 Particle Size Analyzer with o-xylene or isopropyl alcohol as the dispersing media.
Centrifugable solids were determined by centrifuging a sample of the polymer polyol for about 24 hours at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

The method and polymer polyols of the invention will be further described with respect to the following illustrative examples.

EXAMPLES 1-6

All the polymer polyols prepared according to the method of the invention incorporated some version of the following experimental procedure unless otherwise specified. Into a 3 liter, 4-neck resin kettle equipped with stirrer, condenser, thermometer, addition tube, were charged the indicated amounts of base polyol under a blanket of nitrogen. After heating the reactor charge to reaction temperature, the feed charge or stream was added over the indicated time period to give a milk-white polymer polyol. Upon completion of the addition, the polymer polyol was held at the indicated reaction temperature for from 0.5 to 1.0 hours, the soak time or digest time, and then the reaction mixture was stripped for 1.5 to 2.5 hours at about 90° to 120° C. at less than 5 mmHg to yield the polymer polyols.

For examples 1-8, the initiator was Vazo 67, and the digestion time was 0.5 hours. ARCOL ® 1130 was used as the base polyol in these examples. Examples 1-3 were made using modified RCOL ® 1372 as the dispersant, and Examples 4-7 were made using THANOL ® SF-5507 (4700 MW, OH#34) as the polyol dispersant. These latter two polyols were modified with an epoxy resin. Their formulations give suitable polymer polyols at a SAN ratios of 70/30. Note also that the resulting polymer polyols have relatively low viscosities. Additionally, in Example 3, less dispersant is used as a percentage of the total polyol, but more total polyol is used in the feed therein. However, in Example 8, no dispersant was used. It may be readily seen that the viscosity is appreciably higher than the comparable examples using a dispersant, and that the particle sizes and centrifugable solids were too high to be acceptable.

TABLE I

|  | Example No. | | | | | | | |
| --- | --- | --- | --- | --- | --- | --- | --- | --- |
|  | 1 | 2 | 3 | 4 | 5 | 6 | 7 | 8 |
| Monomer Charge, Wt. % | 20 | 20 | 20 | 20 | 20 | 20 | 20 | 20 |
| SAN Weight Ratio | 70/30 | 70/30 | 70/30 | 70/30 | 70/30 | 70/30 | 70/30 | 70/30 |
| % Dispersant of Total Polyol | 3.0 | 3.0 | 1.5 | 3.0 | 5.0 | 5.0 | 3.0 | — |
| % of Total Polyol in Feed | 80 | 65 | 90 | 94 | 95 | 80 | 82 | 90 |
| Reaction Temp., °C. | 120 | 120 | 120 | 120 | 120 | 120 | 120 | 120 |
| Initiator Conc., Wt. % | 0.5 | 0.5 | 0.5 | 0.5 | 0.5 | 0.5 | 0.5 | 0.5 |
| Feed, Addition Time, hr. | 2.0 | 2.0 | 2.0 | 2.0 | 2.0 | 2.0 | 2.0 | 1.5 |
| Feed, g. | | | | | | | | |
| Styrene | 280 | 280 | 280 | 280 | 280 | 280 | 280 | 280 |
| Acrylonitrile | 120 | 120 | 120 | 120 | 120 | 120 | 120 | 120 |
| VAZO 67 | 10.0 | 10.0 | 10.0 | 10.0 | 10.0 | 10.0 | 10.0 | 10.0 |
| Base Polyol | 1280 | 1040 | 1440 | 1504 | 1520 | 1280 | 1312 | 1440 |
| Reactor Charge, g. | | | | | | | | |
| Base Polyol | 272 | 512 | 136 | 48 | — | 240 | 240 | 160 |
| Dispersant | 48 | 48 | 24 | 48 | 80 | 80 | 48 | — |
| Polymer Polyol Properties | | | | | | | | |
| Overall Monomer Conv., % | 93 | 93 | 91 | 93 | 90 | 92 | 91 | 94 |
| Viscosity cps, 20/sec | 1510 | 2000 | 1400 | 1430 | 1270 | 1920 | 1920 | 3150 |
| Particle Size, μ | 0.97 | 1.13 | 1.81 | 1.00 | 1.36 | 1.86 | 2.03 | >3.0 |
| Centrifugable Solids, Wt. % | 3.9 | 3.5 | 9.2 | 7.9 | 3.4 | 7.5 | 12.0 | >20 |

EXAMPLES 9-14

Table 2 illustrates additional examples of the invention at increased SAN ratios of 75/25. In Example 9 no dispersant was used for comparison. Note that the resultant polymer polyol formed had a very high viscosity, as well as other unacceptable properties. Examples 10-12 used THANOL SF-5507 as a dispersant, and Example 13 used epoxy modified ARCOL 1372 as dispersant.

The base polyol employed in Examples 9-13 was THANOL SF-5505, which has not been modified with an epoxy resin. Note that the viscosity, average particle size, and centrifugable solids % all remain acceptable. Conditions were the same as for examples 1-8. Note that most of the polyol is in the feed stream.

Example 14 used THANOL SF-5507 as a base polyol alone. Its preparation is most comparable to Example 10, and the resulting monomer conversion, particle size and centrifugable solids are about the same for these two Examples. However, the viscosity of Example 10 was 2560 cps as compared with 3145 of Example 14, indicating that polymer polyols with reduced viscosities are available when an epoxy resin-modified polyol is used as a dispersant with a base polyol, rather than as a base polyol alone.

TABLE II

| Example No. | 9 | 10 | 11 | 12 | 13 | 14 |
|---|---|---|---|---|---|---|
| Monomer Charge, Wt. % | 20 | 20 | 20 | 20 | 20 | 20 |
| SAN Weight Ratio | 75/25 | 75/25 | 75/25 | 75/25 | 75/25 | 75/25 |
| Dispersant | — | 1 | 1 | 1 | 2 | — |
| % Dispersant of Total Polyol | 0 | 30 | 15 | 5 | 5 | 0 |
| % of Total Polyol in Feed | 70 | 70 | 70 | 70 | 70 | 70 |
| Reaction Temp., °C. | 120 | 120 | 120 | 120 | 120 | 120 |
| Initiator Conc., Wt. % | 0.5 | 0.25 | 0.25 | 0.25 | 0.5 | 0.25 |
| Feed, Addition Time, hr. | 2 | 2 | 2 | 2 | 2 | 2 |
| Reactor Charge, g. | | | | | | |
| Base Polyol | 480 | — | 240 | 400 | 400 | 480 |
| Dispersant | — | 480 | 240 | 80 | 80 | — |
| Feed, g. | | | | | | |
| Styrene | 300 | 300 | 300 | 300 | 300 | 300 |
| Acrylonitrile | 100 | 100 | 100 | 100 | 100 | 100 |
| VAZO 67 | 10 | 5 | 5 | 5 | 10 | 5 |
| Base Polyol | 1120 | 1120 | 1120 | 1120 | 1120 | 1120 |
| Polymer polyol Properties | | | | | | |
| Overall Monomer Conv., % | 96.0 | 93.2 | 93.1 | 92.5 | 94.3 | 94.0 |
| Viscosity cps, 20/sec | 8000 | 2560 | 2460 | 3060 | 3380 | 3145 |
| Particle Size, μ | >3 | 0.83 | 0.97 | 1.47 | 1.20 | 0.86 |
| Centrifugable Solids, Wt. % | 9.4 | 2.2 | 2.9 | 4.4 | 3.3 | 2.4 |

Polyols:
[1]Thanol ® SF-5507
[2]0.67% Epoxy modified ARCOL ® 1372

PREPARATION OF SLAB POLYURETHANE FOAMS

The polymer polyols prepared in accordance with the above examples may then be incorporated into a formulation which results in a polyurethane product. The polymer polyol of the invention may be used in conjunction with a polyisocyanate or may be combined with additional polyols well known in the art, and reacted with a polyisocyanate to form a slab polyurethane foam product. In one aspect of the invention, the polymer polyol of this invention for slab polyurethane foams employs dispersant polyols modified with about 1 wt.% epoxy resin. In these particular examples showing the utility of the polymer polyols of the present invention, slab polyurethane foams are produced. It will be shown that the polymer polyols of the present invention may also be blended with conventional polyols.

In order to form the polyurethane foam, a catalyst useful in preparing foams of this type is employed in the usual manner. Such catalyst may include those mentioned above, or one or more of the following:

(a) Tertiary amines such as trimethylamine, triethylamine, N-methylmorpholine, N-ethylmorpholine, N,N-dimethylbenzylamine, N,N-diemethylethanolamine, N,N,N',N'-tetramethyl-1,3-butanediamine, N,N-dimethylpiperazine, 1,4-diazobicyclo[2.2.2.]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicylcaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as Ti(OR)$_4$, Sn(OR)$_4$, Al(OR)$_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 to 2.0 parts by weight.

As is well known, the polyol component for the polyurethane foam is reacted in the presence of one or more of the above catalysts with a polyisocyanate according to conventional procedures. The polyisocyanate used may be any aromatic or aliphatic polyisocyanate, such as toluene diisocyanates, polymeric isocyanates and aliphatic diisocyanates. Typical aromatic polyisocyanates include, but are not limited to, m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate. Suitable aliphatic diisocyanates would include isophorone diisocyanate, hexamethylene diisocyanate and methylene-bis-cyclohexylisocyanate. Toluene diisocyanates are preferred.

Aromatic polyisocyanates suitable for use include methylene-bridged polyphenyl polyisocyanate mixtures which have a functionality from about 2 to about 4.

These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyisocyanates and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Often, the most preferred methylene-bridged polyphenyl polyisocyanate mixtures used here contain from about 20 to about 100 wt.% methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt.% methylene diphenyl diisocyanate isomers, of which 20 to about 95 wt.% thereof is the 4,4'-isomer with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Foaming is carried out in the presence of water and, optionally, additional organic blowing agents. The water is normally used in amounts of 0.5 to 15 parts by weight, preferably, 1.0 to 10 parts by weight (pbw) based on 100 parts by weight of the polymer polyol and any additional polyol present. The organic blowing agents optionally used along with the water are known in the art and are, for example, monofluorotrichloromethane, difluorodichloromethane, methylene dichloride and others generally known in the art. Additives to regulate the cell size and the cell structure, for example, silicone surfactant such as dimethylpolysiloxanes, may also be added to the foaming mixture. Fillers, flame retarding additives, dyes or plasticizers of known types may also be used. These and other additives are well known to those skilled in the art.

The polymer polyols of the present invention would also be useful in the preparation of molded polyurethane foams. In one aspect, the polymer polyol useful in molded foam employs a dispersant polyol modified with about 1-2 wt.% epoxy resin based on the total polyol. Molded polyurethane foams are prepared somewhat similarly to slab foams, except that they are cast in a mold, rather than allowed to rise freely. They are made by reacting the vinyl (SAN) polymer polyols described above with an organic polyisocyanate in the presence of a polyurethane formation catalyst. A blowing agent such as a halocarbon (e.g. trichlorofluoromethane), water or carbon dioxide may also be present. The polyurethane formation catalysts are typically tin catalysts or tertiary amine compounds. Other additives, such as silicone surfactants, etc. may also be present. For more information on preparing polyurethanes, particularly flexible polyurethanes, see U.S. Pat. Nos. 4,338,408; 4,342,687 and 4,381,353, incorporated by reference herein. It is expected that the foams made using the SAN polymer polyols described herein would have good load bearing properties. Flexible carpet underlay foam and molded automobile foam with lower polymer loadings and better load bearing properties are expected to be prepared using the techniques mentioned herein. These improvements could be accomplished with lower levels of polymer polyol, which is a significant advantage in foam manufacture.

The use of the polymer polyols of the invention in making slab polyurethane foams will be illustrated with the aid of the following examples. These examples are intended to illustrate the invention, but are not intended to delineate the expected scope of the invention.

Procedure: The polyurethane foam was separately prepared by charging the amounts of polyol, polymer polyol, water, catalysts, silicone surfactant, and flame retardant compound indicated into a one-liter cylindrical container equipped with a mechanical stirrer. The mixture was stirred for about 30 seconds at about 2500 rpm, and the indicated amount of polyisocyanate was introduced into the container with stirring for about 10 seconds. The contents of the container were then immediately poured into a cardboard cake box and the foam was allowed to rise. After the foam rise was completed, the foam was allowed to cure at room temperature for about one week.

EXAMPLE 15

This example will show the use of the polymer polyol of Example 4 in the preparation of a slab polyurethane foam. This Example demonstrates that polyurethane foams with good load bearing properties may be made with the polymer polyols of the present invention.

| FORMULATION | parts by wt. |
|---|---|
| ARCOL ® 1130 | 60 |
| Polymer Polyol | 40 |
| Water | 4.2 |
| Niax 5750 Surfactant[1] | 1 |
| Niax A-200 Catalyst[2] | 0.23 |
| T-9 Catalyst[3] | 0.15 |
| Thermolin 101 Flame Retardant[4] | 10 |
| TDI Index | 108 |

[1]Silicon surfactant, made by Union Carbide Corp.
[2]Amine catalyst, made by Union Carbide Corp.
[3]Organotin catalyst, made by Air Products and Chemicals, Inc.
[4]Tetrakis(2-Chloroethyl)Ethylene Diphoshpate, made by Olin Corporation

TABLE III

| Slab Polyurethane Foam Preparation | |
|---|---|
| Foam Example No. | 15 |
| Polymer Polyol # | 4 |
| Foam Reactivity | |
| Cream Time, sec. | 7 |
| Peak Rate, in./min. | 0.79 |
| Cell Openness, % | 80 |
| Density, PCF (lb./ft$^3$) | 1.86 |
| Air Flow, CFM (ft$^3$/min.) | 1.5 |
| Tensile Strength, PSI (lb./in.$^2$) | 15 |
| Elongation, % | 140 |
| Tear Strength, PLI (lb./linear in.) | 2.23 |
| Compression Set, 90% | 10.5 |
| HACS[1], 90% | 12.3 |
| CFD, 25% | 0.59 |
| CFD, 40% | 0.615 |
| CFD, 65% | 1.06 |
| GCFD[2], 25% | 0.32 |
| Sag Factor | 1.80 |

[1]Humid Age Compression Set
[2]Guide Compression Force Deflection

| GLOSSARY | |
|---|---|
| ARCOL ® 1130 | A glycerin initiated polyether of propylene oxide and ethylene oxide |

| -continued | |
|---|---|
| GLOSSARY | |
| | having a hydroxyl number of 48 and containing essentially secondary hydroxyl groups, made by ARCO Chemical Company. |
| Modified ARCOL ® 1372 | A glycerin initiated polyether of propylene oxide and ethylene oxide modified with the diglycidyl ether of bisphenol A, with a hydroxyl number of 25 and a primary hydroxyl group content of 80% of the total hydroxyl content of the polyether, made by ARCO Chemical Co. |
| THANOL SF-5505 | A glycerin initiated polyether of propylene oxide and ethylene oxide with a hydroxyl number of 34 and a primary hydroxyl group content of 80% based on the total hydroxyl content of the polyether, made by ARCO Chemical Company. |
| THANOL SF-5507 | A glycerin initiated polyether of propylene oxide and ethylene oxide modified with the diglycidyl ether of bisphenol A, with a hydroxyl number of 34 and a primary hydroxyl group content of 80% based on total hydroxyl content of the polyether, made by ARCO Chemical Company. |
| Vazo 67 | 2,2'-Azobis(2-methylbutanenitrile) polymerization catalyst made by E. I. duPont de Nemours and Co. |

Thus, it is apparent that the use of epoxy resin-modified polyols as dispersants in the preparation of polymer polyols results in the ability to use higher SAN weight ratios, and higher polymer solids contents along with acceptable viscosities. The use of epoxy resin-modified polyols as dispersants results in polymer polyols having higher styrene contents, and improved stability and viscosity properties.

Many modifications may be made in the polymer polyols of this invention and their method of production without departing from the spirit and scope of the invention, which are defined only in the appended claims. For example, one skilled in the art could adjust the temperature, pressure, reactants, proportions and modes of addition within the parameters set forth to provide polymer polyols with particularly advantageous properties, or polymer polyols that give foams with optimal properties.

We claim:

1. Stable, low viscosity polymer polyols made by a process comprising polymerizing, via a free-radical reaction, an addition polymerizable monomer component with ethylenic unsaturation, in the presence of a polyol mixture comprising a base polyol unmodified with an epoxy resin and an epoxy resin-modified polyol as a dispersant, where the ratio of base polyol to epoxy resin-modified polyol dispersant ranges from about 50/50 to about 99/1, and where the wt.% of epoxy resin in the epoxy resin-modified polyol dispersant ranges from about 0.25 to about 5.0 wt.% based on the total epoxy resin-modified polyol dispersant.

2. The stable, low viscosity polymer polyols of claim 1 where the monomer component is a mixture of styrene and acrylonitrile in a ratio greater than 60/40.

3. The stable, low viscosity polymer polyols of claim 1, where said polymer polyols have a particle size of about 5.0 μm or less.

4. The stable, low viscosity polymer polyols of claim 1 where the epoxy resin-modified dispersant is made by reacting a polyol initiator having an active hydrogen functionality of 3 to 8 and one or more alkylene oxides with an epoxy resin.

5. The stable, low viscosity polymer polyols of claim 4, where the epoxy resin-modified polyol dispersant is made by adding from about 0.25 to about 2.0 wt.% epoxy resin, based on the total polyol dispersant.

6. The stable, low viscosity polymer polyols of claim 4, where the epoxy resin-modified polyol dispersant is made by adding from about 0.5 to about 1.5 wt.% epoxy resin, based on the total polyol dispersant.

7. The stable, low viscosity polymer polyols of claim 1 where the epoxy resin-modified dispersant is made by reacting a polyol initiator having an active hydrogen functionality of 3 to 8 and one or more alkylene oxides with an epoxy resin in such a manner that the epoxy resin is added internally along the length of the resultant epoxy resin-modified polyol.

8. The method for making polymer polyols of claim 1 where the reactor is selected from the group of reactors consisting of a batch reactor, a semi-batch reactor and at least one continuous stirred tank reactor (CSTR) in series.

9. Stable, low viscosity polymer polyols made by the process comprising the steps of:
charging an epoxy resin-modified polyol dispersant to a reactor, where the wt.% of epoxy resin in the epoxy resin-modified polyol dispersant ranges from about 0.25 to about 5.0 wt.% based on the total polyol dispersant;
feeding an addition polymerizable monomer component with ethylenic unsaturation, an initiator suitable for polymerizing the monomer component and a base polyol to the reactor, where the ratio of the base polyol to the epoxy resin-modified polyol dispersant ranges from about 50/50 to about 99/1; and
polymerizing the monomer component in the presence of the base polyol and the epoxy resin-modified polyol dispersant.

10. Stable, low viscosity polymer polyols made by the process comprising the steps of:
charging a first portion of a base polyol and an epoxy resin-modified polyol dispersant to a batch reactor, where the base polyol is unmodified with epoxy resin, and where the wt.% of epoxy resin in the epoxy resin-modified polyol dispersant ranges from about 0.25 to about 5.0 wt.% based on the total epoxy resin-modified polyol dispersant;
feeding an addition polymerizable monomer component with ethylenic unsaturation, an initiator suitable for polymerizing the monomer component and a second portion of the base polyol to the reactor; and
polymerizing the monomer component in the presence of the base polyol and the epoxy resin-modified polyol dispersant,
where the ratio of the total of the first and second portion of the base polyol to the epoxy resin-modified polyol dispersant ranges from about 50/50 to about 99/1.

11. The stable, low viscosity polymer polyols of claim 10, where said polymer polyols have a particle size of about 5.0 μm or less.

12. A method for making stable, low viscosity polymer polyols comprising polymerizing, via a free-radical reaction, an addition polymerizable monomer component with ethylenic unsaturation, in the presence of a polyol mixture comprising a base polyol unmodified with epoxy resin and an epoxy resin-modified polyol as a dispersant, where the ratio of base polyol to epoxy resin-modified polyol dispersant ranges from about 50/50 to about 99/1, and where the wt.% of epoxy resin in the epoxy resin-modified polyol dispersant ranges from about 0.25 to about 5.0 wt.% based on the total epoxy resin-modified polyol dispersant.

13. The method for making polymer polyols of claim 12 where the epoxy resin-modified dispersant is made by reacting a polyol initiator having an active hydrogen functionality of 3 to 8 and one or more alkylene oxides with an epoxy resin.

14. The method for making polymer polyols of claim 13 where the epoxy resin-modified dispersant is made by reacting a polyol initiator having an active hydrogen functionality of 3 to 8 and one or more alkylene oxides with an epoxy resin in such a manner that the epoxy resin is added internally along the length of the resultant epoxy resin-modified polyol.

15. A method for making stable, low viscosity polymer polyols comprising the steps of:
adding a charge to a batch reactor, where the charge comprises an epoxy resin-modified dispersant and a first portion of a base polyol unmodified with epoxy resin, and where the wt.% of epoxy resin in the epoxy resin-modified polyol dispersant ranges from about 0.25 to about 5.0 wt.% based on the total epoxy resin-modified polyol dispersant;
providing a feed stream to the reactor, where the feed stream comprises a second portion of the base polyol, an addition polymerizable monomer component with ethylenic unsaturation and an initiator suitable for polymerizing the monomer portion,
where the first portion of the base polyol is less than the second portion of the base polyol, and the ratio of the total of the first and second portions to the portion of epoxy resin-modified polyol dispersant ranges from about 50/50 to about 99/1.

16. The method for making polymer polyols of claim 15 where the epoxy resin-modified dispersant is made by reacting a polyol initiator having an active hydrogen functionality of 3 to 8 and one or more alkylene oxides with an epoxy resin.

17. The method for making polymer polyols of claim 15 where the epoxy resin-modified dispersant is made by reacting a polyol initiator having an active hydrogen functionality of 3 to 8 and one or more alkylene oxides with an epoxy resin in such a manner that the epoxy resin is added internally along the length of the resultant epoxy resin-modified polyol.

18. The method for making polymer polyols of claim 15 where the monomer portion is a mixture of styrene and acrylonitrile in a ratio of styrene to acrylonitrile of from more than 60/40 to 85/15.

19. The method for making polymer polyols of claim 15 where the reactor is selected from the group of reactors consisting of a batch reactor, a semi-batch reactor and at least one continuous stirred tank reactor (CSTR).

20. A method for making stable, low viscosity polymer polyols comprising the steps of:
adding a charge to a batch reactor, where the charge comprises a first portion of a base polyol and an epoxy resin-modified dispersant, where the dispersant is made by reacting a polyol initiator having an active hydrogen functionality of 3 to 8 and one or more alkylene oxides with from about 0.25 to about 5.0 wt.% of an epoxy resin based on the total epoxy resin-modified polyol dispersant;
providing a feed stream to the reactor, where the feed stream comprises a second portion of the base polyol, an addition polymerizable monomer component with ethylenic unsaturation and an initiator suitable for polymerizing the monomer portion,
where the ratio of the total of the first and second portion of the base polyol to the epoxy resin-modified dispersant is in the range of about 50/50 to about 99/1.

21. The method for making polymer polyols of claim 20 where the monomer portion is a mixture of styrene and acrylonitrile in a ratio of styrene to acrylonitrile of from more than 60/40 to 85/15.

22. The method for making polymer polyols of claim 20 where the reactor is selected from the group of reactors consisting of a batch reactor, a semi-batch reactor and at least one continuous stirred tank reactor (CSTR).

* * * * *

UNITED STATES PATENT AND TRADEMARK OFFICE
CERTIFICATE OF CORRECTION

PATENT NO. : 4,891,395
DATED : January 2, 1990
INVENTOR(S) : Robert G. Gastinger, John E. Hayes It is certified that error appears in the above—identified patent and that said Letters Patent is hereby corrected as shown below:

On the title page, at "Inventors," add as a named inventor:

--Michael E. Brennan, West Chester, Pa.--

Signed and Sealed this

Nineteenth Day of May, 1992

Attest:

DOUGLAS B. COMER

*Attesting Officer*  *Acting Commissioner of Patents and Trademarks*